April 27, 1954  B. WILLACH  2,676,490

ANGULAR CONNECTION PRESSURE GAUGE

Filed April 26, 1950

INVENTOR.
Bernhard Willach
BY

Patented Apr. 27, 1954

2,676,490

UNITED STATES PATENT OFFICE 2,676,490

ANGULAR CONNECTION PRESSURE GAUGE

Bernhard Willach, Chicago, Ill., assignor to Jas. P. Marsh Corporation, Skokie, Ill., a corporation of Illinois Application April 26, 1950, Serial No. 158,270

3 Claims. (Cl. 73—411)

1

The present invention relates to indicating instruments, such as pressure gauges, in which the indicating mechanism is mounted on a post or stem intended for connection to a container for indicating a condition interiorly thereof.

More particularly, this invention relates to pressure gauges and the like in which the general plane of the instrument face or dial is tilted upwardly when the instrument is mounted for use.

An instrument such as a pressure cooker gauge is usually mounted in the lid of the cooker with the post of the instrument extending vertically therefrom. If the instrument face or dial is arranged in a vertical plane it will be difficult to read from a distance thereabove. Accordingly, when such a gauge is used with a pressure cooker placed on a stove, it is difficult to read.

To overcome this disadvantage, the present gauge is constructed with the dial face tilted upwardly with respect to the post, so that when the post is vertical the dial faces upwardly at an angle to the horizontal.

It is therefore an object of this invention to produce an indicating instrument mounted on a post with the face or dial tilted upwardly to facilitate accurate reading from a location thereabove.

Heretofore when it was desired to provide a gauge in which the face was tilted upwardly, the post itself was bent or constructed so that the opposite ends were at an angle to each other. This could be accomplished either by machining or bending to the desired angular shape. Both of these methods were quite difficult, and accordingly, were very costly.

The present gauge is provided with a straight post having a flange arranged at one end extending outwardly at an angle to the main axis of the post. The dial and operative mechanism of the instrument are mounted on the flange of the post. Such a post may be readily constructed by a very simple milling operation.

It is therefore another object of the present invention to provide an inexpensive, readily constructed indicating instrument mounted on a post in which the face or dial of the instrument is tilted upwardly when the post is vertically arranged.

It is customary to enclose indicating instruments in casings with covers over the front thereof. The casing of the present instrument is provided with the usual post-receiving opening and adjacent to the opening is indented and bent so that a portion of substantial area will abut one side of the post and may be readily secured

2 thereto by a single screw passing through the abutting portion of the casing and into the post. With such construction the instrument-operating mechanism and casing are no larger than when an ordinary straight post is employed.

Another object of the present invention, therefore, is to provide a compact indicating instrument having a casing thereover, with both the casing and operating mechanism mounted on the post and tilted with respect to the axis of the post.

Further objects and advantages will be apparent from the following description and claims when considered with the accompanying drawings, in which:

Figures 1, 2:
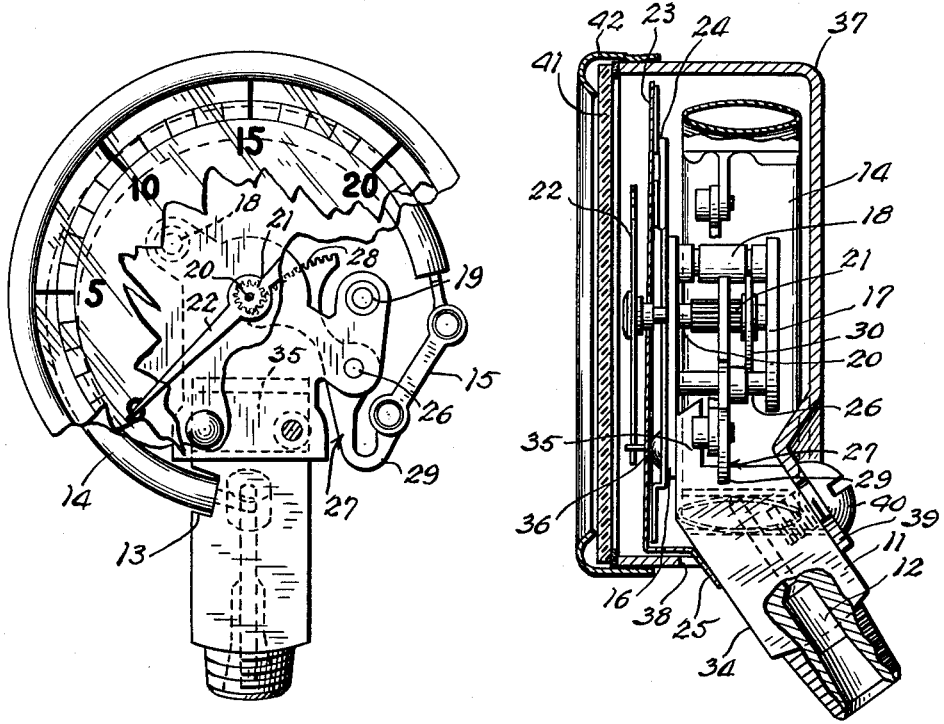
Fig. 1 is a front elevational view of a pressure gauge embodying the present invention with portions broken away.
Fig. 2 is a central, vertical, cross-sectional view of the pressure gauge shown in Fig. 1 with portions thereof in elevation.
Figure 3:
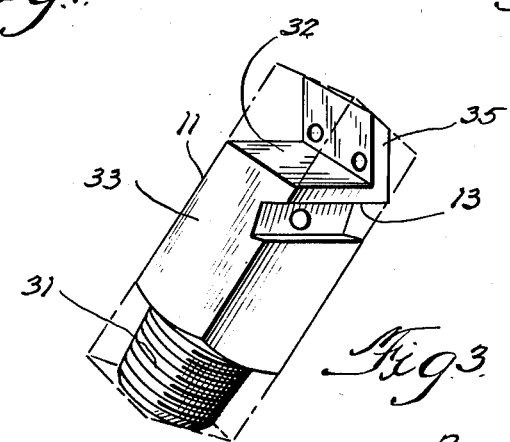
Fig. 3 is a perspective view of the instrument post showing in dotted lines the original shape of the piece of material from which the post is formed.

Referring more particularly to the drawings, there is shown a pressure gauge embodying the present invention. The gauge comprises a post 11 having a central passageway 12 therein communicating with an opening 13 in one side of the post into which one end of a Bourdon tube 14 is secured in any suitable manner, so as to be in communication with the central passageway of the post 11. A pivotally mounted link 15 connects the free end of the Bourdon tube 14 to the indicating mechanism.

The indicating mechanism is preferably assembled as a unit as shown in Figs. 1 and 2. This construction may comprise a pair of parallel front and rear plates 16 and 17 secured together in spaced relation by pins or columns 18 and 19. The end portions of the columns, which may be tubular and of reduced diameter, are passed through openings provided therefor in the plates 16 and 17, and the outer ends are then flared or expanded as shown in Fig. 1. An indicator shaft 20 having a pinion 21 thereon is rotatably mounted in the plates 16 and 17 with the pinion intermediate the two plates. One end of the indicator shaft 20 projects through the front plate 17 for receiving thereon an indicating hand 22. The indicator hand 22 is positioned over and cooperates with an indicating dial 23 which may be rotatably mounted on a slightly dished dial support 24. For this purpose the dial 23 may be provided with peripheral tabs which are bent about the periphery of the dial support 24. This permits adjustment of the gauge by rotating the dial on its support 24, for which purpose an extension 25 may be provided at the bottom of the dial.

Rotatably mounted between the plates 16 and 17 is an arbor 26 carrying a lever 27. One end of the lever consists of an integral gear segment 28 for meshing with the pinion 21, and an integrally-formed gooseneck arm 29 at the opposite end of the lever is pivotally connected to the link 15 and thereby to the pressure-responsive Bourdon tube 14. The usual hair spring 30 is arranged about the indicator shaft 20 with its outer end secured to the column 18. With the above construction, changes in pressure cause movement of the free end of the Bourdon tube which is transmitted by the link 15 and lever 27 to the pinion 21, indicator shaft 20, and the indicator or hand 22. As hereinafter described, the operating mechanism is secured to the post in such a manner that the dial 23 will be facing upwardly when the instrument is in normal operating position.

The post 11 is preferably formed from a suitable metal rod or bar square in cross section. One end 31 is threaded to permit the post to be secured into a tapped opening. The opening 13 at one side is milled at an angle to the longitudinal axis of the post. Thus, when the post is tilted forwardly as shown in Fig. 2, the Bourdon tube 14, which is at an obtuse angle to the axis of the post, will be mounted in a substantially vertical position. Accordingly, if the post is arranged in a vertical position, as is normal, the Bourdon tube will be tilted rearwardly at the top.

The outer or free end of the post 11 is milled to provide a preferably flat surface 32 which slopes outwardly from the rear side 33 of the post to the forward side 34 thereof substantially parallel to the slot 13. Extending upwardly substantially normal to the outer surface 32 is a flange 35, which may also be formed by a milling operation. The flange 35 therefore extends outwardly from the rest of the post 11 and slopes rearwardly with respect thereto.

The operating mechanism of the instrument is secured to the front face of the flange 35 by means of screws or rivets 36 which pass through the dial support 24 and front plate 16 and into the flange which is provided with suitable holes for receiving them. As the dial is mounted on the support 24 it also is secured to and supported by the flange 35. Thus the dial and the operating mechanism associated therewith are tilted upwardly so as to be clearly visible when the post is arranged vertically in the usual manner.

The instrument is preferably provided with a dished casing 37 having an opening 38 in the bottom thereof through which the post 11 extends. The rear side of the casing 37 is bent inwardly adjacent the opening 38 to provide an angled portion 39 of substantial area shaped to abut the rear side of the post 11. The casing is also supported on the post by suitable securing means, such as the screw 40 which passes through an opening in the angled portion 39 of the casing and threads into a tapped opening provided in the rear of the post 11. The casing may be provided with a front glass 41 held in place by a securing ring 42.

With this construction the dial, operating mechanism and casing are supported on the post and are tilted with respect to the axis of the post. The whole device is as compact as comparable instruments in which the ordinary straight post is employed. Moreover, the post with the flange 35 may be readily machined to its desired shape.

The present invention has been described in connection with a pressure gauge. However, it is applicable to other indicating instruments supported on posts.

While a particular embodiment of this invention has been illustrated and described, it will be understood of course that the invention is not to be limited thereto since many modifications may be made, and it is contemplated, therefore, by the appended claims to cover any such modifications as fall within the true spirit and scope of this invention.

I claim:

1. A device of the character described comprising a dial, an indicator, mechanism for actuating said indicator including a Bourdon tube, an integral post of substantially uniform cross-sectional shape throughout most of its length with all parts thereof lying within the outer boundaries of said section for being connected at one end to a container and having a longitudinal passageway therein for communicating with the interior of said container and said Bourdon tube, said post having a slot in one side thereof extending along a line defining a substantial angle with both the longitudinal axis of the post and a line perpendicular to said axis with a supporting flange extending outwardly from adjacent the outer end of said slot and substantially normal to the longitudinal axis of said slot, said slot being in communication with said longitudinal passageway and having one end of said Bourdon tube therein for connection with said passageway, said post having the outer end thereof sloping inwardly from adjacent the inner end of said flange, said indicator and actuating mechanism being mounted on said supporting flange, a substantially cylindrical casing fitting about said mechanism and dial having a back portion closing the rear thereof and an opening in the bottom side thereof fitting about said post, said back portion having an area adjacent said opening sloping rearwardly and downwardly with the inner surface of said sloping portion shaped similarly to the adjacent rear side of said post, and fastening means extending through said sloping portion and into said post for securing said rearwardly sloping portion against the rear side of said post.

2. A device of the character described comprising a dial, an indicator, mechanism for actuating said indicator including a Bourdon tube, an integral post of substantially uniform cross-sectional shape throughout most of its length with all parts thereof lying within the outer boundaries of said section for being connected at one end to a container and having a longitudinal passageway therein for communicating with the interior of said container and said Bourdon tube, said post having a slot in one side thereof extending along a line defining a substantial angle with both the longitudinal axis of the post and a line perpendicular to said axis with a supporting flange extending outwardly from adjacent the outer end of said slot and substantially normal to the longitudinal axis of said slot, said slot being in communication with said longitudinal passageway and having one end of said Bourdon tube therein for connection with said passageway, said post having the outer end thereof sloping inwardly from adjacent the inner end of said flange and lying in a plane substantially normal to said flange, said indicator and actuating mechanism being mounted on said supporting flange, a substantially cylindrical casing fitting about said mechanism and dial having a back portion closing the rear thereof and an opening in the bottom side thereof fitting about said post, said back portion having an area adjacent said opening sloping rearwardly and downwardly with the inner surface of said sloping portion shaped similarly to the adjacent rear side of said post, and fastening means extending through said sloping portion and into said post for securing said rearwardly sloping portion against the rear side of said post with the axis of said casing substantially parallel to the slot in said post.

3. A device of the character described comprising a dial, an indicator, mechanism for actuating said indicator including a Bourdon tube, an integral post of substantially uniform rectangular cross-sectional shape throughout most of its length with all parts thereof lying within the outer boundaries of said section for being connected at one end to a container and having a longitudinal passageway therein for communicating with the interior of said container and said Bourdon tube, said post having a slot in one side thereof extending along a line defining a substantial angle with both the longitudinal axis of the post and a line perpendicular to said axis with a supporting flange extending outwardly from adjacent the outer end of said slot and substantially normal to the longitudinal axis of said slot, said slot being in communication with said longitudinal passageway and having one end of said Bourdon tube therein for connection with said passageway, said post having the outer end thereof sloping inwardly from adjacent the inner end of said flange, said indicator and actuating mechanism mounted on said supporting flange, a substantially cylindrical casing fitting about said mechanism and dial having a back portion closing the rear thereof and an opening in the bottom side thereof fitting about said post, said back portion having a substantial area adjacent said opening sloping rearwardly and downwardly at substantially the same angle as that between the line of said slot and the axis of said post, and fastening means extending through said sloping portion and into said post for securing said rearwardly sloping portion against the rear side of said post with the axis of said casing substantially parallel to the slot in said post.

References Cited in the file of this patent

UNITED STATES PATENTS

| Number | Name | Date |
|---|---|---|
| 1,018,582 | Nelson | Feb. 27, 1912 |
| 1,233,297 | Babikian | July 17, 1917 |
| 1,499,657 | Heise et al. | July 1, 1924 |
| 1,929,606 | Phelan | Oct. 10, 1933 |
| 2,002,950 | Klein | May 28, 1935 |
| 2,343,464 | Lienau et al. | Mar. 7, 1944 |